US012692754B2

(12) United States Patent (10) Patent No.: US 12,692,754 B2
Switzer et al. (45) Date of Patent: Jul. 28, 2026

(54) EXTERNAL GAP ASSEMBLY

(71) Applicant: QUANTUM ENERGY TECHNOLOGIES LLC, Houston, TX (US)

(72) Inventors: David A. Switzer, Calgary (CA); Danick R. J. Normandeau, Calgary (CA); Kyle W. Twynam, Calgary (CA)

(73) Assignee: QUANTUM ENERGY TECHNOLOGIES LLC, Houston, TX (US)

( * ) Notice: Subject to any disclaimer, the term of this patent is extended or adjusted under 35 U.S.C. 154(b) by 165 days.

(21) Appl. No.: 18/533,076

(22) Filed: Dec. 7, 2023

(65) Prior Publication Data

US 2024/0191582 A1 Jun. 13, 2024

Related U.S. Application Data

(60) Provisional application No. 63/431,267, filed on Dec. 8, 2022.

(51) Int. Cl.
*E21B 17/02* (2006.01)
*E21B 47/13* (2012.01)
*F16L 15/08* (2006.01)

(52) U.S. Cl.
CPC .......... *E21B 17/0285* (2020.05); *E21B 47/13* (2020.05); *F16L 15/08* (2013.01)

(58) Field of Classification Search
CPC .... E21B 17/0285; E21B 47/13; E21B 17/042; E21B 17/003; E21B 17/046; F16L 15/08; F16L 2201/40; F16L 25/021; F16L 25/02
See application file for complete search history.

(56) References Cited

U.S. PATENT DOCUMENTS

| | | | |
|---|---|---|---|
| 5,163,714 A | 11/1992 | Issenmann | |
| 6,158,532 A * | 12/2000 | Logan ..................... F16L 25/02 |
| | | | 175/320 |
| 6,404,350 B1 | 6/2002 | Soulier | |
| 6,439,324 B1 | 8/2002 | Ringgenberg et al. | |
| 7,252,160 B2 | 8/2007 | Dopf et al. | |
| 7,255,183 B2 * | 8/2007 | Cramer ............... E21B 17/0285 |
| | | | 166/242.6 |
| 7,605,716 B2 * | 10/2009 | Peter .................... G01V 11/002 |
| | | | 340/854.6 |

(Continued)

*Primary Examiner* — Yong-Suk (Philip) Ro
(74) *Attorney, Agent, or Firm* — Basil M. Angelo; ANGELO IP

(57) ABSTRACT

An external gap assembly for a gap sub includes a plurality of non-conductive spacer rings and a plurality of high-strength conductive spacer rings arranged in an alternating pattern about an exterior of the gap sub, a non-conductive external gap seal sleeve disposed beneath the spacer rings that electrically insulates the conductive spacer rings from upper and lower conductive portions of the gap sub, and a plurality of seals disposed between an internal diameter of an upper conductive portion and an interior diameter of a lower conductive portion of the gap sub and the non-conductive external gap seal sleeve. Advantageously, the resistance of the non-conductive gap may be controllably increased, compression and torque on the stack may be controlled, and conductive drilling fluids may be prevented from penetrating the gap sub, thereby enhancing transmission efficiency.

22 Claims, 14 Drawing Sheets

120

(56)                           References Cited

U.S. PATENT DOCUMENTS

| | | | | |
|---|---|---|---|---|
| 7,782,060 B2 * | 8/2010 | Clark | .................... | E21B 47/113 |
| | | | | 324/369 |
| 7,900,968 B2 | 3/2011 | Camwell et al. | | |
| 9,670,771 B2 | 6/2017 | Logan et al. | | |
| 11,280,437 B2 | 3/2022 | Stack et al. | | |
| 2004/0104047 A1 * | 6/2004 | Peter | .................... | E21B 17/003 |
| | | | | 340/854.6 |
| 2015/0330155 A1 * | 11/2015 | Logan | .................. | E21B 17/042 |
| | | | | 166/242.6 |

* cited by examiner

100

135

130

125

120

115

105

110

EXTERNAL GAP ASSEMBLY

CROSS-REFERENCE TO RELATED APPLICATIONS

This application claims the benefit of, or priority to, U.S. Provisional Patent Application Ser. No. 63/431,267, filed on Dec. 8, 2022, which is hereby incorporated by reference in its entirety for all purposes.

BACKGROUND OF THE INVENTION

In oil and gas exploration, measurement while drilling ("MWD") is a type of well logging that uses real-time telemetry to communicate downhole sensor data to the surface to assist with steering and control of the drilling operation. Sensors and telemetry components of the MWD system are typically placed approximately 50 feet from the drill bit and above the motor assembly. The downhole telemetry system establishes a communication link with the surface using one or more transmission methods, the most common of which are mud pulse ("MP") telemetry and electromagnetic ("EM") telemetry. Less common transmission methods include drill pipe acoustic telemetry and wired drill pipe telemetry.

EM telemetry systems transmit downhole data to the surface by generating encoded EM signals in the wellbore that travel through the earth for detection at or near the surface. EM communications are typically electric field-based (with a voltage applied across a non-conductive gap of a gap sub assembly) or magnetic field-based (with a current conducted through inductive coils). Advantages of EM telemetry, relative to MP telemetry, include faster transmission rates (2-30 bits/second), independence from mud flow and its properties, increased reliability due to no moving downhole parts, and bi-directional communication capabilities. Disadvantages of EM telemetry are related to the high attenuation of EM signals due to the resistivity of the formation, conductivity in the drilling fluid, and noise generated by electrical equipment on the surface. As such, EM telemetry does not work well in areas where the combination of depths, fluids, and formation resistivities severely attenuate EM signals.

An EM telemetry system is typically packaged in a small diameter probe that is positioned within a drill collar and centered along the axis of the gap sub. As noted above, the gap sub partitions the drill string into two conductive portions that are electrically insulated from one another by the non-conductive gap of the gap sub. The probe makes independent electrical contact with each of the two conductive portions. When the probe modulates a voltage across the non-conductive gap, the two conductive portions of the drill string serve as a dipole antenna that generates EM waves that propagates through the earth to the surface. The EM waves are detected on the surface by measuring the electrical potential difference between the drill string or a metal casing that extends into the ground and one or more ground rods or conductive stakes that are buried in the ground at some distance from the drilling equipment.

SUMMARY OF THE INVENTION

According to one aspect of one or more embodiments of the present invention, an external gap assembly for a gap sub includes a plurality of non-conductive spacer rings and a plurality of high-strength conductive spacer rings arranged in an alternating pattern about an exterior of the gap sub, a non-conductive external gap seal sleeve disposed beneath the spacer rings that electrically insulates the conductive spacer rings from upper and lower conductive portions of the gap sub, and a plurality of seals disposed between an internal diameter of the upper conductive portion and an interior diameter of the lower conductive portion of the gap sub and the non-conductive external gap seal sleeve.

According to one aspect of one or more embodiments of the present invention, a gap sub includes a tubular having an upper conductive portion and a lower conductive portion that are electrically insulated from one another, an external gap assembly having a plurality of non-conductive spacer rings and a plurality of high-strength conductive spacer rings arranged in an alternating pattern about an exterior of the tubular, a non-conductive external gap seal sleeve disposed beneath the spacer rings that electrically insulates the conductive spacer rings from the upper and the lower conductive portions of the tubular, and a plurality of seals disposed between an internal diameter of the upper conducive portion and an interior diameter of the lower conductive portion of the tubular and the non-conductive external gap seal sleeve.

Other aspects of the present invention will be apparent from the following description and claims.

DETAILED DESCRIPTION OF THE INVENTION

Figure 1A:
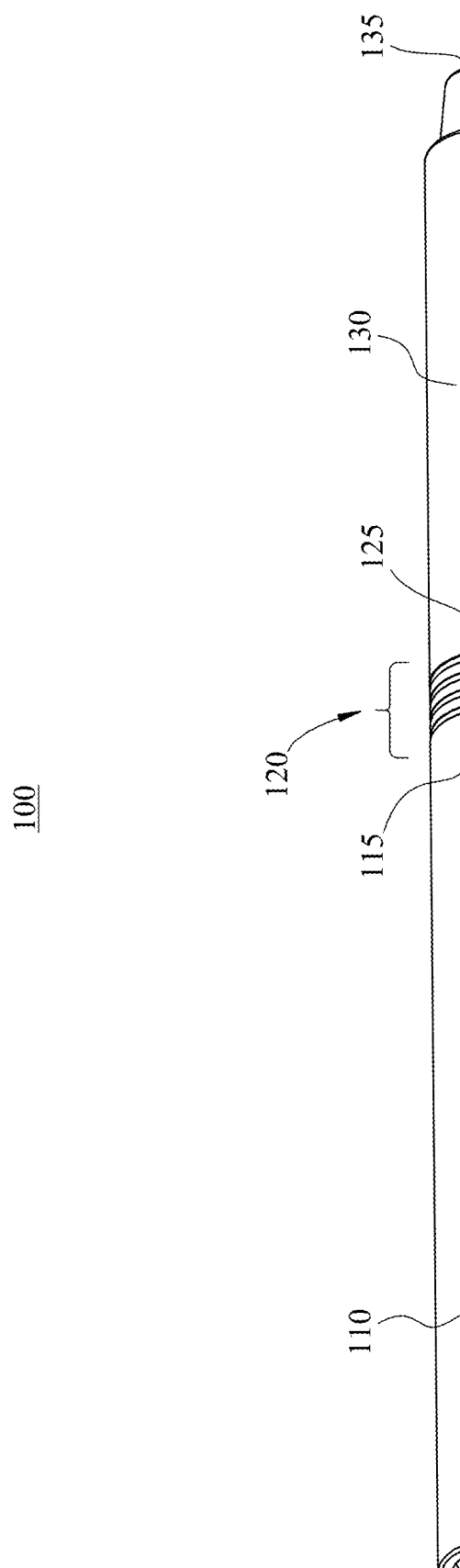
FIG. 1A shows a perspective view of a gap sub with an external gap assembly in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are described to provide a thorough understanding of the present invention. In other instances, aspects that are well-known to those of ordinary skill in the art are not described to avoid obscuring the description of the present invention. For the purposes of this disclosure, upper or uphole refer to portions of apparatus that are disposed above, or closer to the surface, than lower or downhole portions of the same or other apparatus.

A conventional gap sub assembly is a tubular that is deployed as part of a drill string to partition the drill string into an upper conductive portion and a lower conductive portion for conventional EM telemetry. The probe of a conventional EM telemetry system includes an EM signal generator that is responsible for generating an alternating potential difference across the upper conductive portion and the lower conductive portion of the drill string. The probe makes independent electrical contact with an upper conductive portion of the gap sub that electrically communicates with, and is mechanically attached to, the upper conductive portion of the drill string and a lower conductive portion of the gab sub that electrically communicates with, and is mechanically attached to, the lower conductive portion of the drill string. The gap sub includes a non-conductive gap that electrically insulates the upper conductive portion of the gap sub (and therefore the entire upper conductive portion of the drill string) from the lower conductive portion of the gap sub (and therefore the entire lower conductive portion of the drill string). Similar to the drill collar, the probe also requires an electrical discontinuity (e.g., a gap joint). For the insulated conductive portions of the drill string to function efficiently as the dipole antenna, they must be electrically insulated from one another.

To provide the requisite electrical insulation between the upper conductive portion of the drill string above the non-conductive gap and the lower conductive portion, the non-conductive gap is typically made of an electrical insulator material (e.g., rubber, plastic, epoxy, ceramics, etc.). However, electrical insulator materials are substantially weaker than the metals from which the other drill string tubular members are made. As such, a non-conductive gap made of an electrical insulator tends to reduce the mechanical strength of the drill string, which is subjected to extreme differential pressure as well as tensile, compressive, bending, and torsional loads.

A conventional EM telemetry system includes a downhole battery-powered portion, such as, for example, an EM signal generator, and a surface-based EM signal receiver. The EM signal generator applies an alternating potential difference across the dipole that creates an EM signal, that may be thought of as a voltage gradient, that is transmitted through the formation for detection by the EM signal receiver on the surface. The stronger the EM signal, the easier it is to receive it on the surface. However, environmental circumstances may complicate the transmission and reception of such signals.

While conventional gap subs provide electrical insulation between the upper conductive portion and the lower conductive portion of the drill string, the environment in which it is disposed is typically conductive to some degree. For example, certain drilling fluids are conductive and the formation itself, by way of its composition, may be conductive. When the EM signal generator applies a potential difference across the dipole, the conductivity of the drilling fluid and/or the formation may cause leakage current to flow between the gap, taking away finite current from the battery-powered EM signal generator, reducing the maximum potential difference the EM signal generator may effectively apply across the dipole, reducing the capability of the EM signal receiver to receive the EM signal, and thereby reducing the efficiency of EM signal transmission. As such, undesired leakage current effectively caps the EM signal strength capable of being transmitted and therefore limits the ability of the EM signal receiver to receive the transmitted EM signals. Thus, the resistance across the gap is important to ensuring effective EM signal transmission. If the resistance is too low, leakage current substantially reduces the ability to effectively transmit.

A conventional external gap is a component of the gap sub assembly that seeks to improve EM signal transmission by increasing the resistance of the leakage path. The conventional external gap goes on the outer most portion of the gap sub and is subjected to both borewall abrasion and drilling fluid penetration. The conventional external gap attempts to prevent shorts between insulated conductive portions of the gap sub (and therefore the insulated conductive portions of the drill string) and increase the electrical resistance of the leakage path between the insulated conductive portions of the drill string, thereby reducing leakage current that may flow through non-productive paths, and thereby increases the efficiency of EM signal transmission.

Conventional gap subs typically include conventional external gaps made from an injected thermoplastic material (e.g., polyetheretherketone, sometimes referred to as PEEK) or ceramics. The disadvantage of injected thermoplastics is that such an external gap may not withstand the extreme loads, abrasion, and exposure to drilling fluid and, as the result, is prone to breakage and failure. Another disadvantage is that thermoplastic components perform poorly as sealing elements as they are relatively inelastic and tend to permit leaks as compared to typical sealing elastomers. In both cases, drilling fluid is able to penetrate the gap sub and create a low resistance path between the insulated upper and lower conductive portions, thereby reducing the effectiveness of the gap sub. Another disadvantage of injected thermoplastics are their high costs and inability to be removed for servicing or replacement. Often times, when such a failure occurs, the entire gap sub assembly must be replaced if the external gap allows penetration of the drilling fluid.

Alternatively, the external gap may be made from ceramics. However, ceramic materials are quite brittle and a ceramic gap ring may crack during operation. Some conventional gap subs include an external gap that is a combination of conductive wear-resistant elements and injected thermoplastic elements, thereby providing electrical isolation and mechanical strength to the external gap. However, conventional external gap assemblies do not provide an efficient sealing solution and drilling fluids can leak into the gap sub, creating a low resistance path between the insulated upper and lower conductive portions.

Thus, there is a long felt need in the industry for an external gap assembly that that provides an efficient sealing solution to prevent drilling fluid from penetrating into the gap sub, significantly reducing losses arising from leakage current and electrical shorts between both the internal and external components of the gap sub assembly, thereby enhancing the efficiency of EM signal transmission and reception. Such an efficient sealing solution ensures there is no internal pathways within the external gap assembly with a lower resistance than the external path.

In one or more embodiments of the present invention, an external gap assembly may be devised using a "lily pad" technique to create the most resistive path possible while preserving the mechanical wear and abrasion resistance afforded by the selective use of certain metal components. As used in this context, the "lily pad" technique emulates a frog hopping from one lily pad to another, to get from one side of the pond to the other. Likewise, the current flow (and/or electrical field) is forced to "hop" from wear ring to wear ring, to get from one side of the gap sub to the other.

According to one or more embodiments of the present invention, an external gap assembly includes a combination of electrical insulator material and conductive wear-resistant material that are installed on an external diameter of a gap sub to controllably extend the effective gap distance and ensure there are no internal electrical paths with lower resistance than the external path. In certain embodiments, the external gap assembly may include a stack of alternating non-conductive spacer rings and a plurality of high-strength conductive spacer rings, a non-conductive external gap seal sleeve that is positioned beneath the stack of rings to both electrically insulate and serve as a fluid seal between conductive components, and additional seals, typically O-rings, that are positioned on an internal diameter of the non-conductive spacer rings to prevent drilling fluid from penetrating the gap sub and negatively impacting EM signal transmission. While the disclosure that follows discusses the use of an external gap assembly as part of a conventional gap sub, one of ordinary skill in the art, having the benefit of this disclosure, will appreciate that the external gap assembly disclosed herein may be used with any other application that requires electrical insulation and/or fluid isolation in accordance with one or more embodiments of the present invention.

Advantageously, the combination of the number and the width of an alternating pattern of conductive and non-conductive rings, the external gap may extend the effective distance between the upper and lower conductive portions of the gap sub. The unique design coupled with the combination of the non-conductive external gap seal sleeve and plurality of seals, such as, for example, O-rings ensures that there is no internal electrical path with a lower resistance than the external path and prevents conductive drilling fluids from creating such a path. As such, the external gap assembly improves efficiency and signal strength for EM transmission by effectively enhancing the transmitted signal for reception at the surface. Further, the electrical power needed for EM telemetry may be reduced, extending the life of batteries that may be used to power the downhole portions of the EM telemetry system. In addition, the external gap assembly is a serviceable component that may be easily removed and replaced, thereby reducing the manufacturing, installation, and maintenance costs of the entire gap sub assembly.

FIG. 1A shows a perspective view of gap sub 100 with external gap assembly 120 in accordance with one or more embodiments of the present invention. Gap sub 100 may be disposed downhole as part of a drill string (not shown) and used to facilitate the transmission of downhole sensor data to the surface via EM telemetry. Gap sub 100 may be a tubular having an upper conductive portion 110 and a lower conductive portion 130 that are electrically insulated from one another but removably attached to one another such that the tubular of the gap sub 100 has a continuous central lumen (not shown) through the interior of gap sub 100. An upper connection end 105 of upper conductive portion 110 may removably attach to another tubular member or equipment (not shown) disposed above it in the drill string (not shown). Likewise, a lower connection end 135 of lower conductive portion 130 may be removably attached to another tubular member or equipment (not shown) disposed below it in the drill string (not shown). External gap assembly 120 may be disposed about an exterior of upper conductive portion 110 and lower conductive portion 130. Continuing, FIG. 1B shows an elevation view of gap sub 100 with external gap assembly 120 in accordance with one or more embodiments of the present invention.

Figures 1B, 1C:
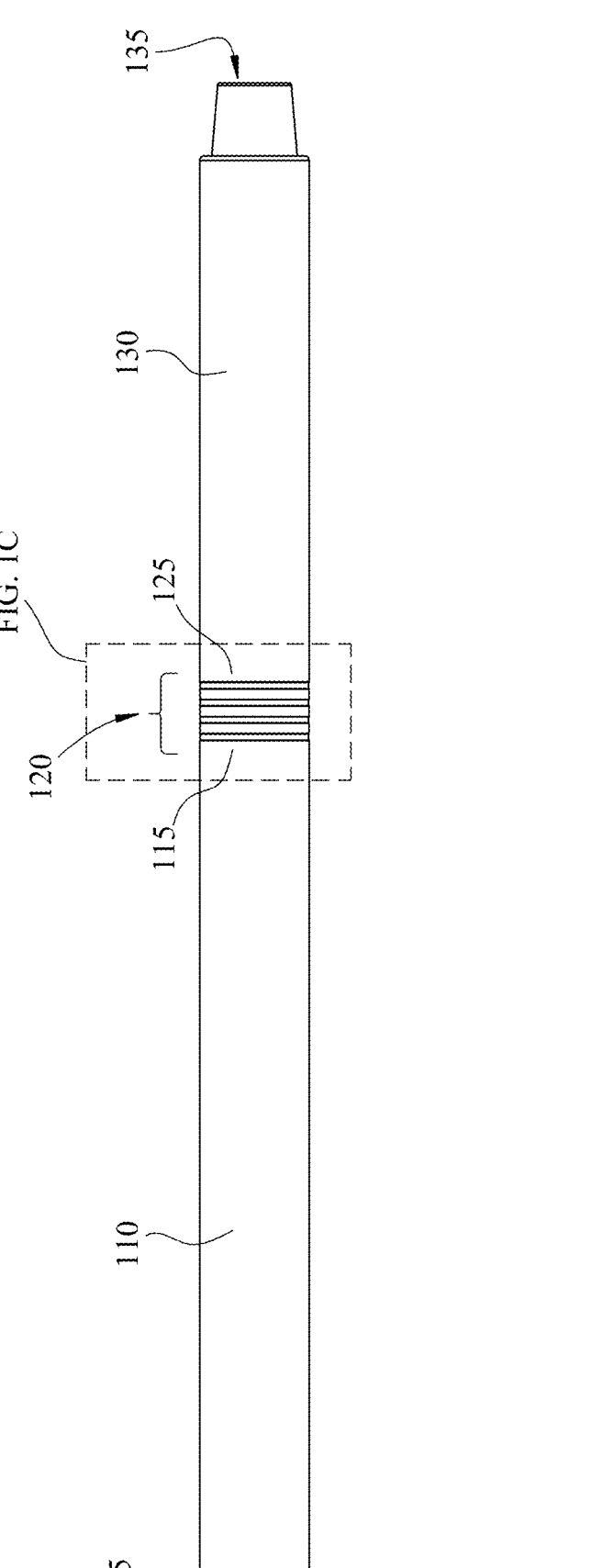
FIG. 1B shows an elevation view of the gap sub with the external gap assembly in accordance with one or more embodiments of the present invention.
FIG. 1C shows detailed elevation view of the external gap assembly of the gap sub in accordance with one or more embodiments of the present invention.
Figure 1C:
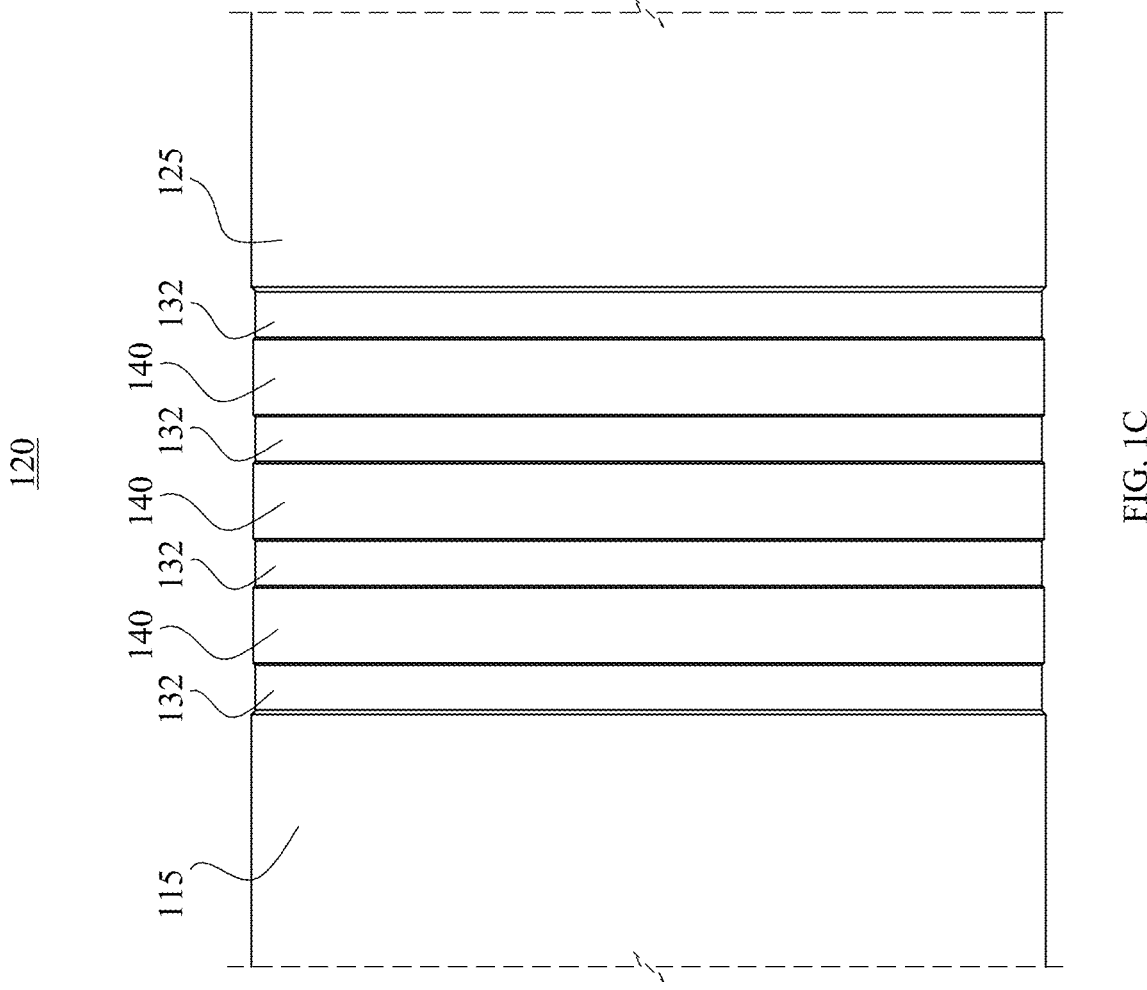

Continuing, FIG. 1C shows detailed elevation view of external gap assembly 120 of gap sub 100 in accordance with one or more embodiments of the present invention. External gap assembly 120 may include a plurality of non-conductive spacer rings 132 and a plurality of high-strength conductive spacer rings 140 arranged in an alternating pattern about an exterior of the gap sub 100. In certain embodiments, the alternating pattern may begin and end with a non-conductive spacer ring 132 that is adjacent to lower connection end 115 of upper conductive portion 110 or upper connection end 125 of lower conducive portion 130. In certain embodiments, such as the one depicted, the alternating pattern may comprise four (4) non-conductive spacer rings 132 and three (3) high-strength conductive spacer rings 140. In other embodiments (not shown), the alternating pattern may comprise ten (10) non-conductive spacer rings 132 and nine (9) high-strength conductive spacer rings 140. In still other embodiments, the number of non-conductive spacer rings 132 and high-strength conductive spacer rings 140 may vary based on an application or design to achieve a desired external gap length or target impedance.

Figures 2A, 2B:
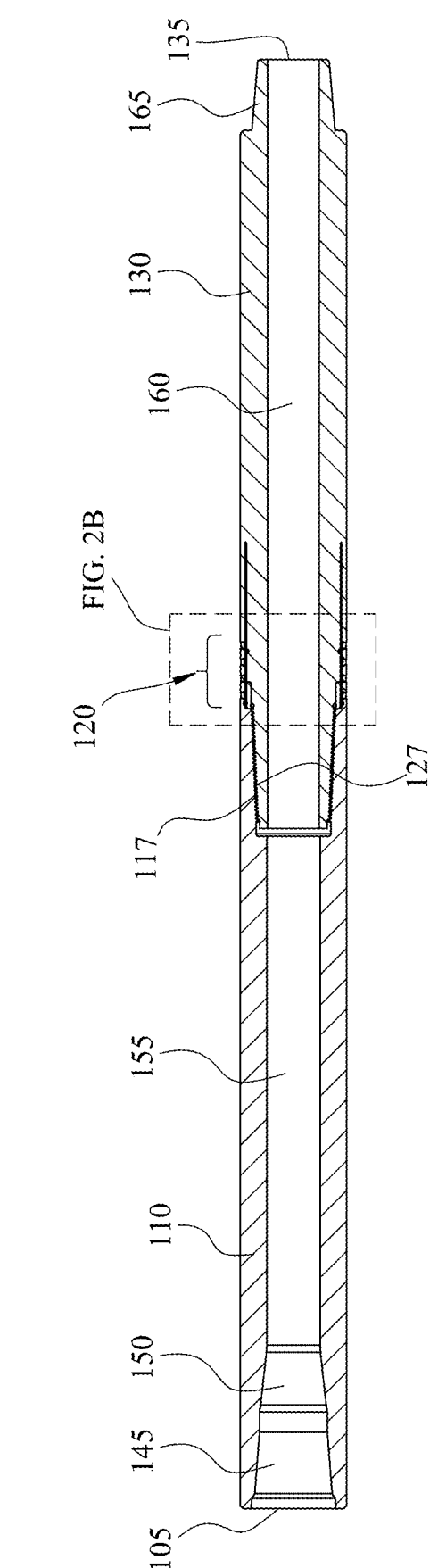
FIG. 2A shows a hybrid cross-sectional view of a gap sub with an external gap assembly in accordance with one or more embodiments of the present invention.
FIG. 2B shows a detailed cross-sectional view of the external gap assembly of the gap sub in accordance with one or more embodiments of the present invention.
Figure 2B:
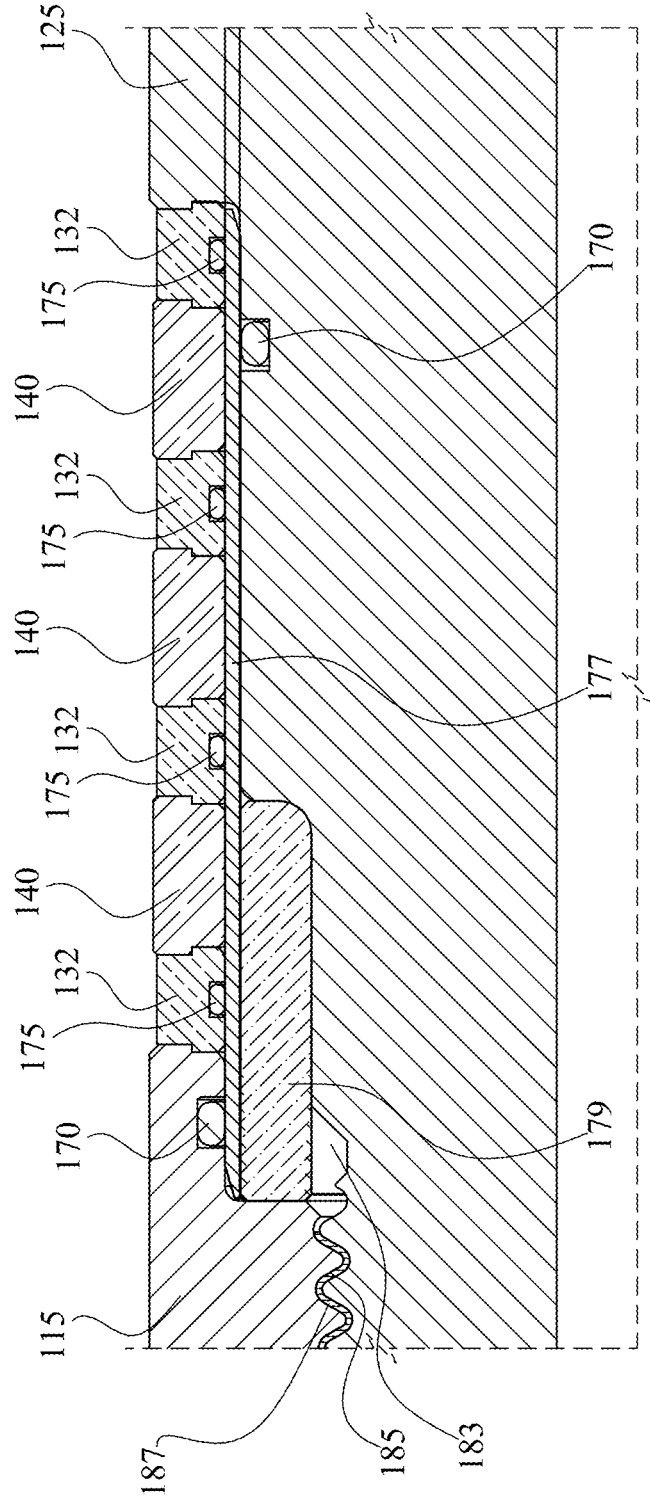

FIG. 2A shows a hybrid cross-sectional view of gap sub 100 with external gap assembly 120 in accordance with one or more embodiments of the present invention. Upper conductive portion 110 of gap sub 100 may include upper connection end 105, optional shoulder or profile area 145, optional shoulder or profile area 150, central lumen 155, and threaded 117 lower connection end 115. Similarly, lower conductive portion 130 of gab sub 100 may include threaded 127 upper connection end 125, central lumen 160, optional tapered profile 165, and lower connection end 135. Threaded 117 lower connection end 115 of upper conductive portion 110 removably engages threaded 127 upper connection end 125 of lower conductive portion 130. An electrical insulator (not independently illustrated) may be disposed between threaded 117 lower connection end 115 and threaded 127 upper connection end 125 to electrically insulate the engagement of threads 117, 127.

Continuing, FIG. 2B shows a detailed cross-sectional view of external gap assembly 120 of gap sub 100 in accordance with one or more embodiments of the present invention. As previously discussed, external gap assembly 120 may include a plurality of non-conductive spacer rings 132 and a plurality of high-strength conductive spacer rings 140 arranged in an alternating pattern about an exterior of gap sub 100. Gap sub 100 may include torque shoulder 179 that allows the plurality of non-conductive spacer rings 132 and the plurality of high-strength conductive spacer rings 140 to be compressed to a desired amount as well provide desired torque when upper conductive portion 110 and lower conductive portion 130 are removably attached to one another during makeup. This allows for positive control of the stack in a manner that permits optimal sealing at the sides of the insulators. In addition, an electrical insulator (not independently illustrated) may be disposed between threads 185, 187 to electrically insulate their connection. As shown, the plurality of non-conductive spacer rings 132 and the plurality of high-strength conductive spacer rings 140 may have shapes that interlock such that the non-conductive spacer rings 132 cannot deform radially outward during typical operations downhole. A non-conductive external gap seal sleeve 177 may be disposed beneath spacer rings 132, 140 to electrically insulate conductive spacer rings 140 from upper conductive portion 110 and lower conductive portion 130 of gap sub 100. The non-conductive external gap seal sleeve 177 serves as an efficient fluid seal between conductive components. While the embodiment depicted shows four (4) non-conductive spacer rings 132 and three (3) high-strength conductive spacer rings 140 arranged in the alternating pattern, one of ordinary skill in the art will recognize that the external gap length may be modified by adding or removing spacer rings 132, 140 to achieve a desired gap length or target impedance.

Figure 2C:
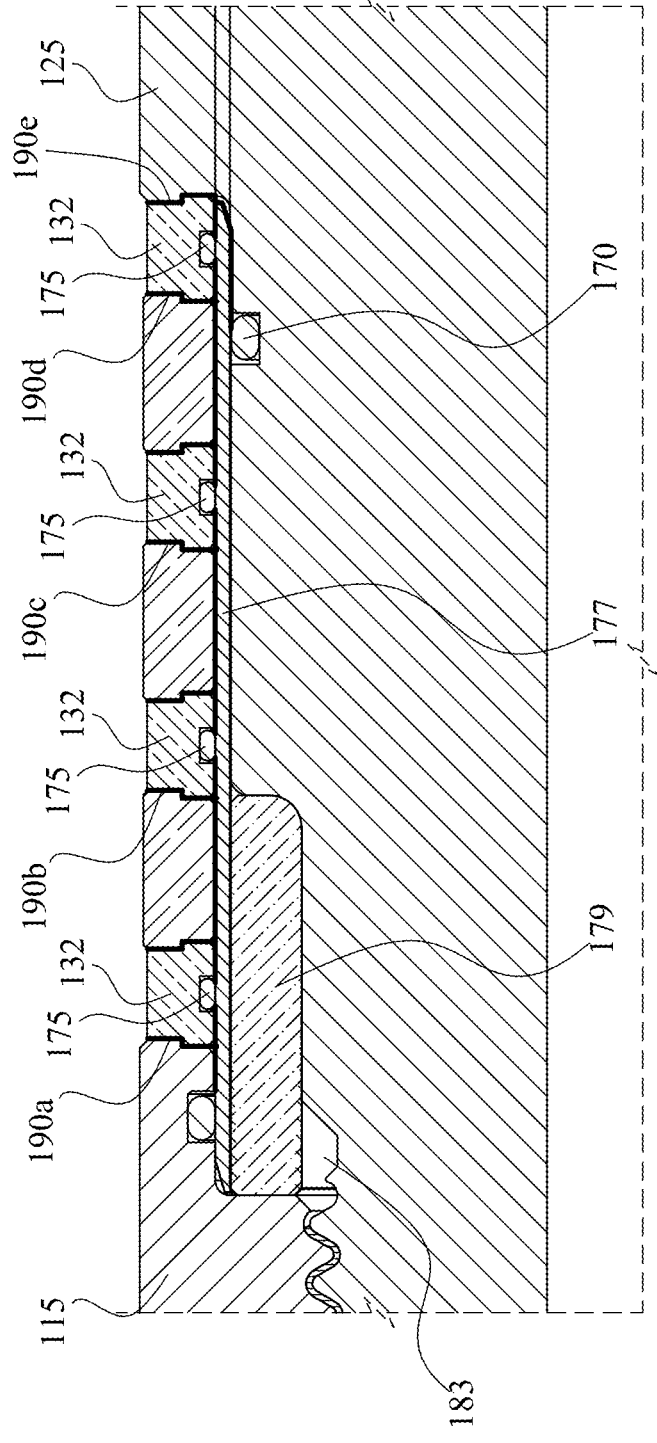
FIG. 2C shows a detailed cross-sectional view of the external gap assembly of the gap sub showing fluid paths in accordance with one or more embodiments of the present invention.

Continuing, FIG. 2C shows a detailed cross-sectional view of external gap assembly 120 of gap sub 100 showing fluid paths 190a, 190b, 190c, 190d, and 190e in accordance with one or more embodiments of the present invention. As previously discussed, to prevent potentially conductive drilling fluids (not shown) from penetrating external gap assembly 120, a plurality of interior seals 175 may be disposed on an internal diameter of the corresponding plurality of non-conductive spacer rings 132. In addition, a plurality of seals 170 may be disposed between an internal diameter of upper conductive portion 110 and non-conductive external gap seal sleeve 177 and between an internal diameter of lower conductive portion 130 and non-conductive external gap seal sleeve 177. As such, conductive drilling fluids that penetrate adjacent components are prevented from fluidly communicating in a manner that potentially shorts conductive components together. Advantageously, drilling fluids are prevented from being communicating in conductive paths or in undesirable areas (e.g., 183) between upper conductive portion 110 and lower conductive portion 130. As shown, the arrangement of seals 170 and 177 ensures that there is no fluid [210] communication between upper conductive portion 110 and lower conductive portion 130, thereby ensuring that they are electrically insulated even when surrounded by conductive drilling fluids (not shown).

Figure 3:
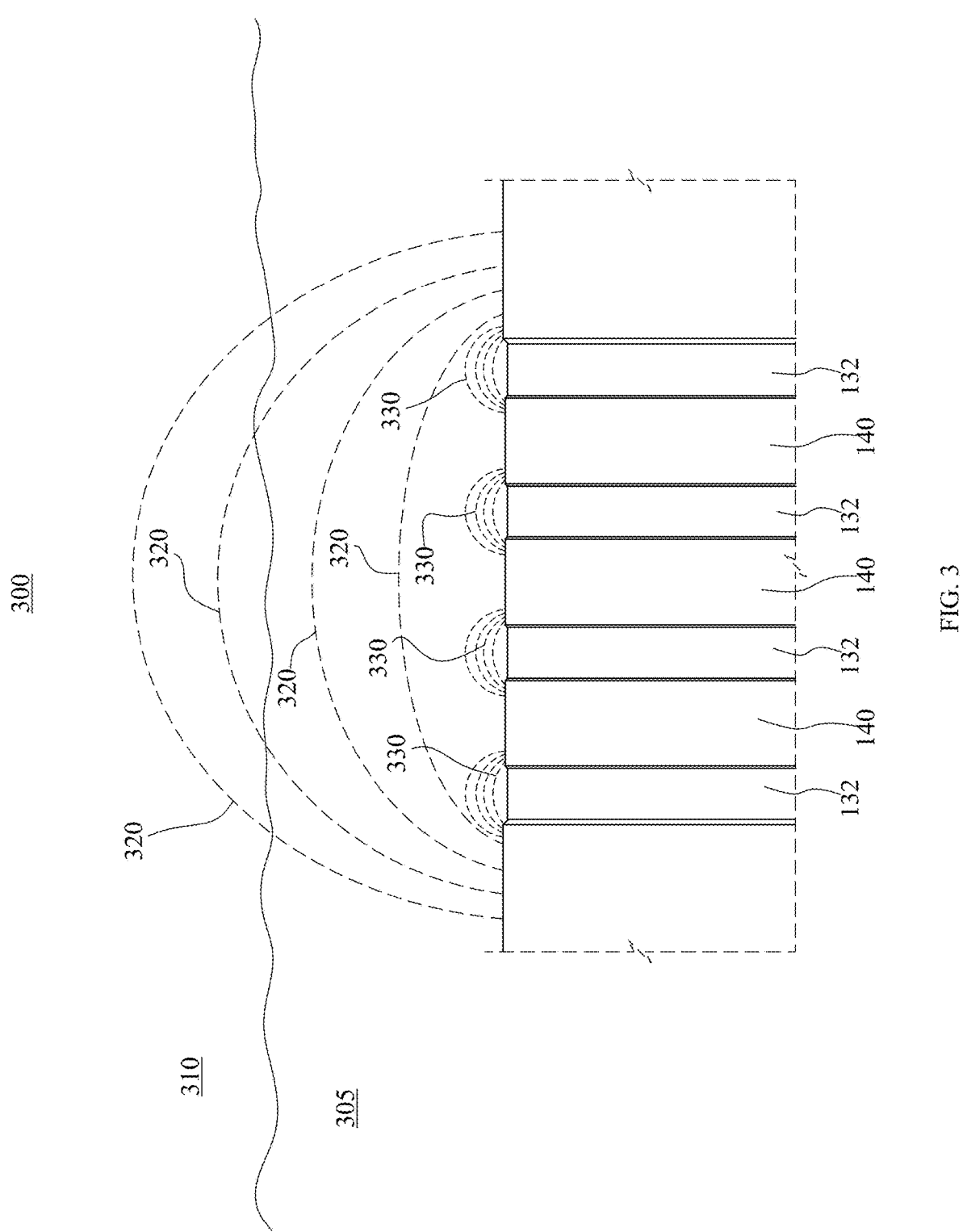
FIG. 3 shows a detailed elevation view of an external gap assembly of a gap sub showing electric field lines of electromagnetic signals being transmitted through earth in accordance with one or more embodiments of the present invention.

FIG. 3 shows a detailed elevation view of external gap assembly 120 of gap sub 100 showing electric fields of electromagnetic signals 320 being transmitted through earth 310 in accordance with one or more embodiments of the present invention. Gap sub 100 may be disposed downhole 305 and the operator may wish to use EM telemetry to transmit sensor data through the formation 310 to the surface (not shown). External gap assembly 120 may extend the effective gap length between upper conductive portion 110 and lower conductive portion 130. In addition, external gap assembly 120 increases the impedance of leakage current paths through drilling fluids (not shown) and formation 310, preventing the possibility of shorts between any components of insulated conductive portions of gap sub 100. Advantageously, a long external gap improves electric field geometry. While short gaps allow field lines to close the loop close to gap sub 200, longer gaps push the field lines further out in a manner that minimizes unhelpful field density near gab sub 200 and increases field density away from gap sub 200, which contributes to measurable gradient at the surface. The length of external gap assembly 120 may be modified as needed to achieve a sufficiently high impedance of the leakage paths. As current will flow through the path of least resistance, external gap assembly 120 creates a highly resistive path that enhances EM signal transmission from gap sub 100 into formation 310.

In certain embodiments, non-conductive spacer rings 132 may be composed of polyetheretherketone ("PEEK"). PEEK is commonly used for electrical insulation in downhole applications and offers a unique combination of mechanical properties including resistance to chemicals, wear, fatigue, and creep as well as exceptionally high temperature resistance up to 260° C. In other embodiments, non-conductive spacer rings 132 may be composed of non-conductive thermoplastic polymer. In still other embodiments, non-conductive spacer rings 132 may be composed of thermoset polymers. In still other embodiments, non-conductive spacer rings 132 may be composed of combinations thereof. One of ordinary skill in the art having the benefit of this disclosure will recognize that non-conductive spacer rings 132 may be composed of any material that is non-conductive and suitable for use in the downhole environment of a given application.

In certain embodiments, high-strength conductive spacer rings 140 may be composed of non-magnetic stainless steel. In other embodiments, high-strength conductive spacer rings 140 may be composed of non-magnetic metal alloys, ceramics, and non-stainless steels or alloys thereof. In still other embodiments, high-strength conductive spacer rings 140 may be composed of combinations thereof. One of ordinary skill in the art having the benefit of this disclosure will recognize that high-strength conductive spacer rings 140 may be composed of any material that is non-magnetic and provides sufficient strength for abrasion and forces encountered in the downhole environment.

In certain embodiments, non-conductive external gap seal sleeve 177 may be composed of PEEK. In other embodiments, non-conductive external gap seal sleeve 177 may be composed of thermoplastics, thermosets, or polyphenylene sulfide ("PPS"). In still other embodiments, non-conductive external gap seal sleeve 177 may be composed of any combinations thereof. One of ordinary skill in the art having the benefit of this disclosure will recognize that non-conductive external gap seal sleeve 177 may be composed of any material that is non-conductive and suitable for use in the downhole environment of a given application.

Figure 4A:
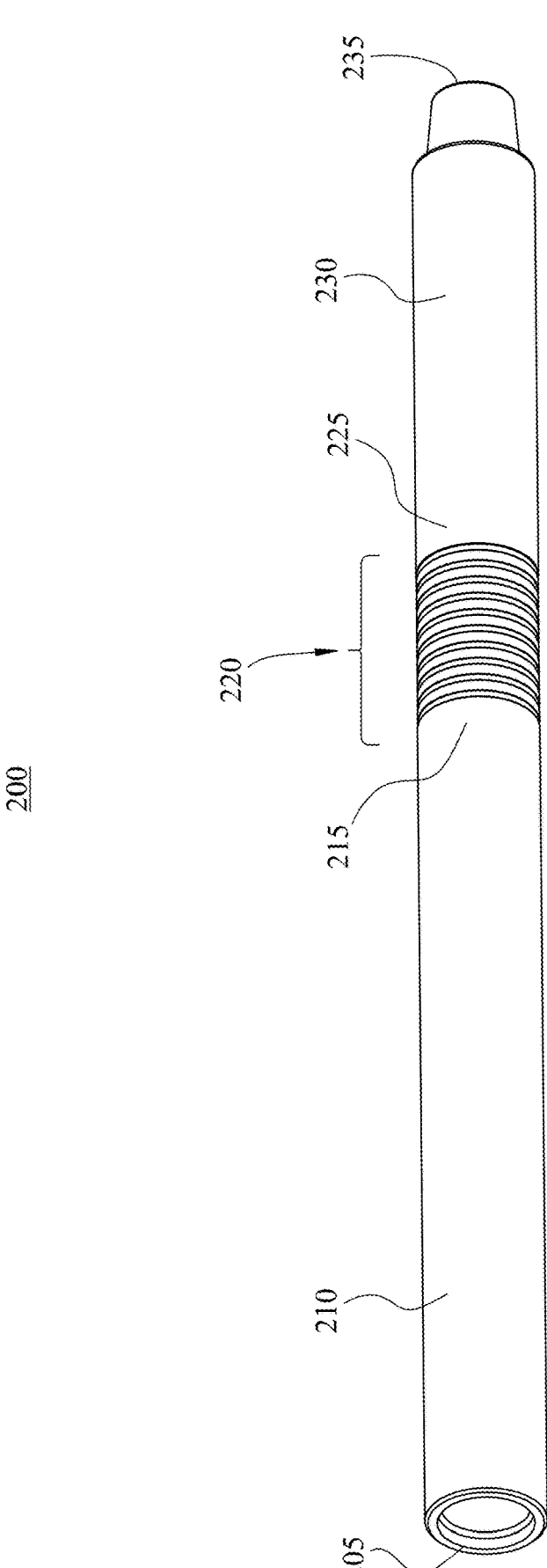
FIG. 4A shows a perspective view of a gap sub with an external gap assembly in accordance with one or more embodiments of the present invention.
Figure 4B:
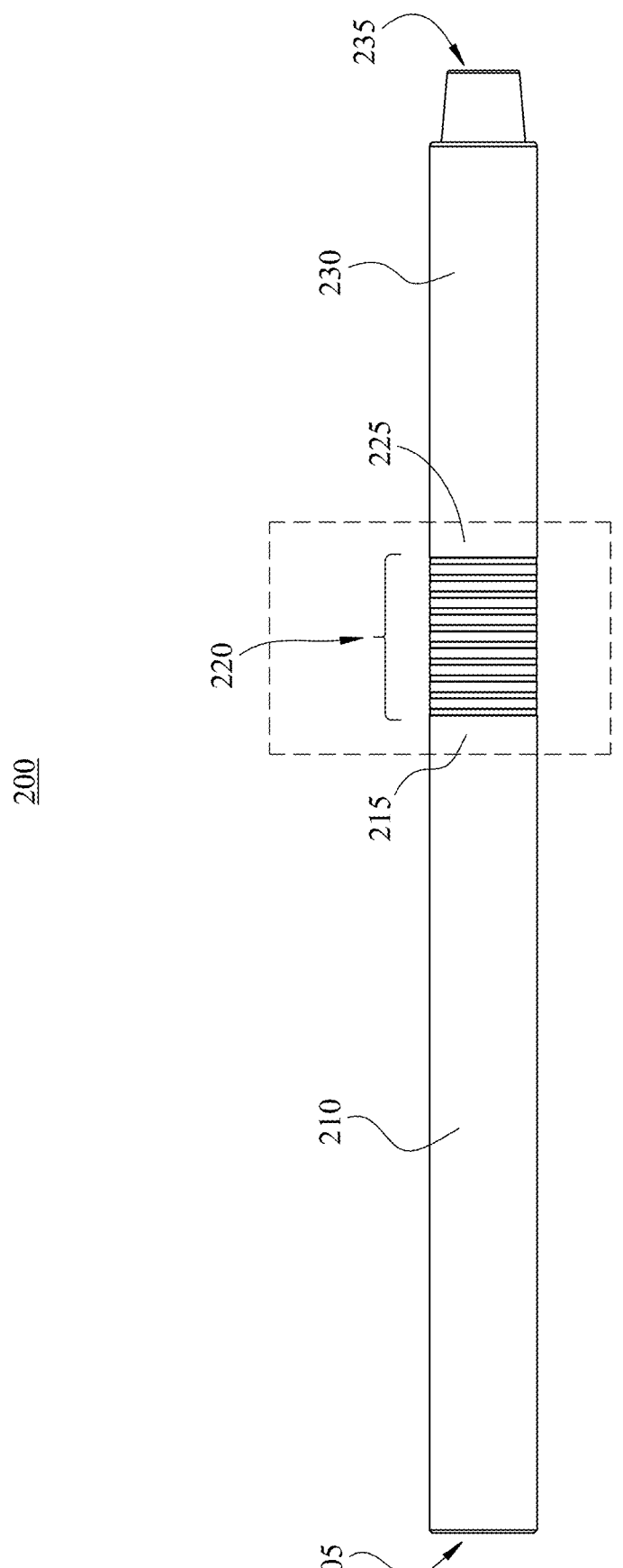
FIG. 4B shows an elevation view of the gap sub with the external gap assembly in accordance with one or more embodiments of the present invention.

FIG. 4A shows a perspective view of gap sub 200 with external gap assembly 220 in accordance with one or more embodiments of the present invention. Gap sub 200 may be disposed downhole as part of a drill string (not shown) and used to facilitate the transmission of downhole sensor data to the surface via EM telemetry. Gap sub 200 may be a tubular having an upper conductive portion 210 and a lower conductive portion 230 that are electrically insulated from one another but removably attached to one another such that the tubular of the gap sub 200 has a continuous central lumen (e.g., 255, 260 of FIG. 5A) through the interior of gap sub 200. An upper connection end 205 of upper conductive portion 210 may removably attach to another tubular member or equipment (not shown) disposed above it in the drill string (not shown). Likewise, a lower connection end 235 of lower conductive portion 230 may be removably attached to another tubular member or equipment (not shown) disposed below it in the drill string (not shown). External gap assembly 220 may be disposed about an exterior of upper conductive portion 210 and lower conductive portion 230. Continuing, FIG. 4B shows an elevation view of gap sub 200 with external gap assembly 220 in accordance with one or more embodiments of the present invention.

Figure 4C:
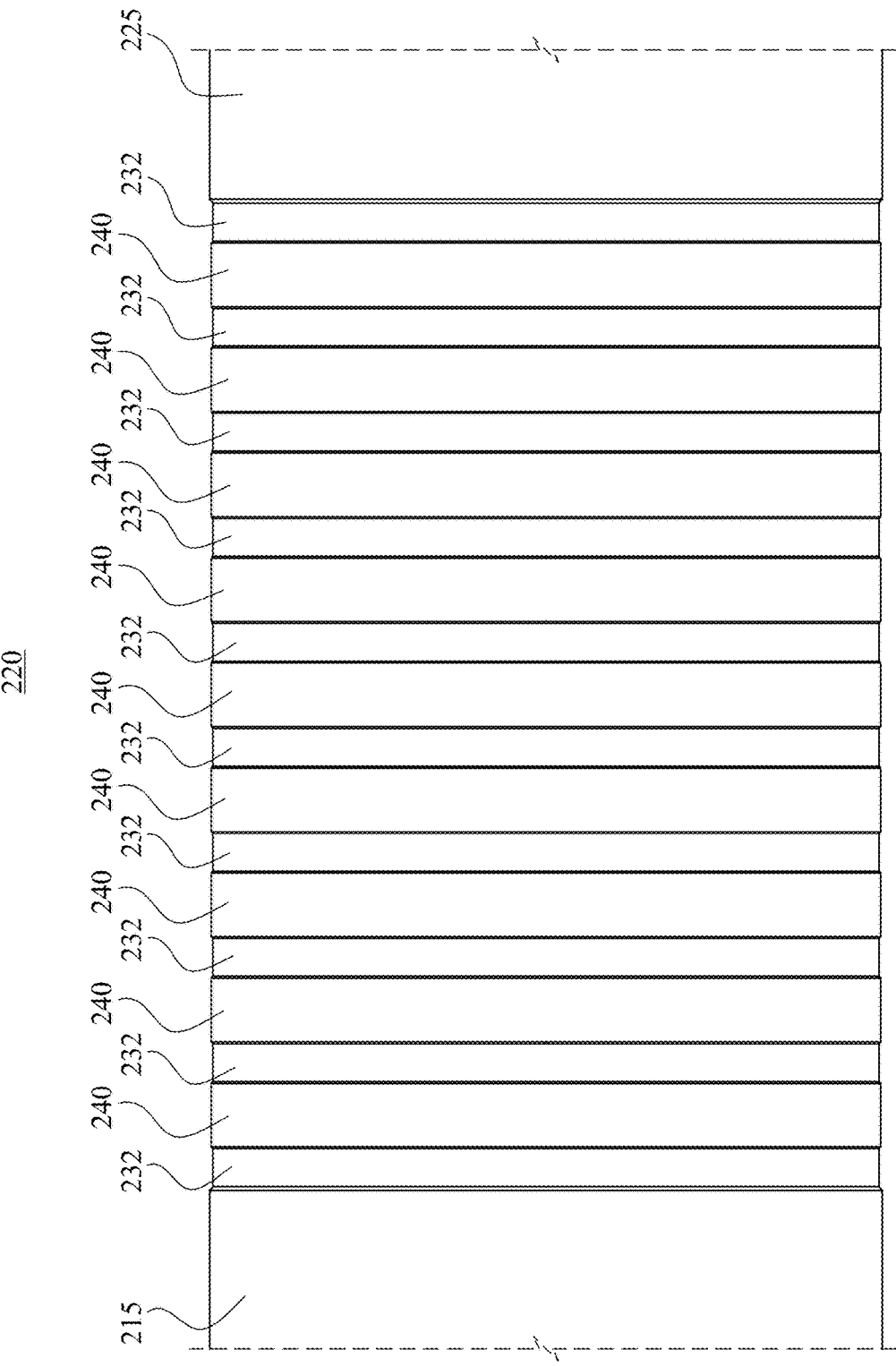
FIG. 4C shows detailed elevation view of the external gap assembly in accordance with one or more embodiments of the present invention.

Continuing, FIG. 4C shows detailed elevation view of external gap assembly 220 in accordance with one or more embodiments of the present invention. External gap assembly 220 may include a plurality of non-conductive spacer rings 232 and high-strength conductive spacer rings 240 arranged in an alternating pattern about an exterior of the gap sub 200. In certain embodiments, the alternating pattern may begin and end with a non-conductive spacer ring 232 that is adjacent to lower connection end 215 of upper conductive portion 210 or upper connection end 225 of lower conducive portion 230. In certain embodiments, such as the one depicted, the alternating pattern may comprise ten (10) non-conductive spacer rings 232 and nine (9) high-strength conductive spacer rings 240. In other embodiments (not shown), the alternating pattern may comprise four (4) non-conductive spacer rings 232 and three (3) high-strength conductive spacer rings 240 (e.g., 100). In still other embodiments, the number of non-conductive spacer rings 232 and high-strength conductive spacer rings 240 may vary based on an application or design to achieve a desired external gap length or target impedance. One of ordinary skill in the art will recognize that non-conductive spacer rings 232 and high-strength conductive spacer rings 240 may be the same as, or vary in size as non-conductive spacer rings 132 and high-strength conductive spacer rings 140 of gap assembly 100 based on the application.

Figures 5A, 5B:
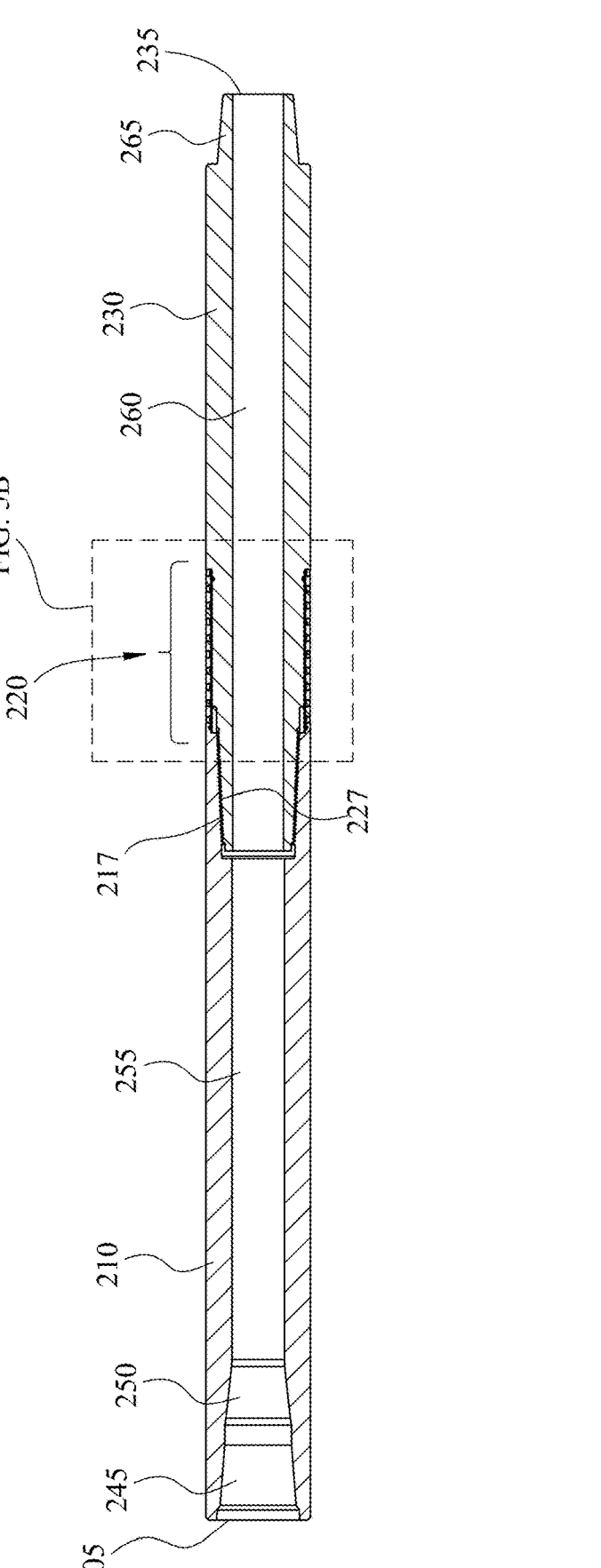
FIG. 5A shows a hybrid cross-sectional view of a gap sub with an external gap assembly in accordance with one or more embodiments of the present invention.
FIG. 5B shows a detailed cross-sectional view of the external gap assembly in accordance with one or more embodiments of the present invention.
Figure 5B:
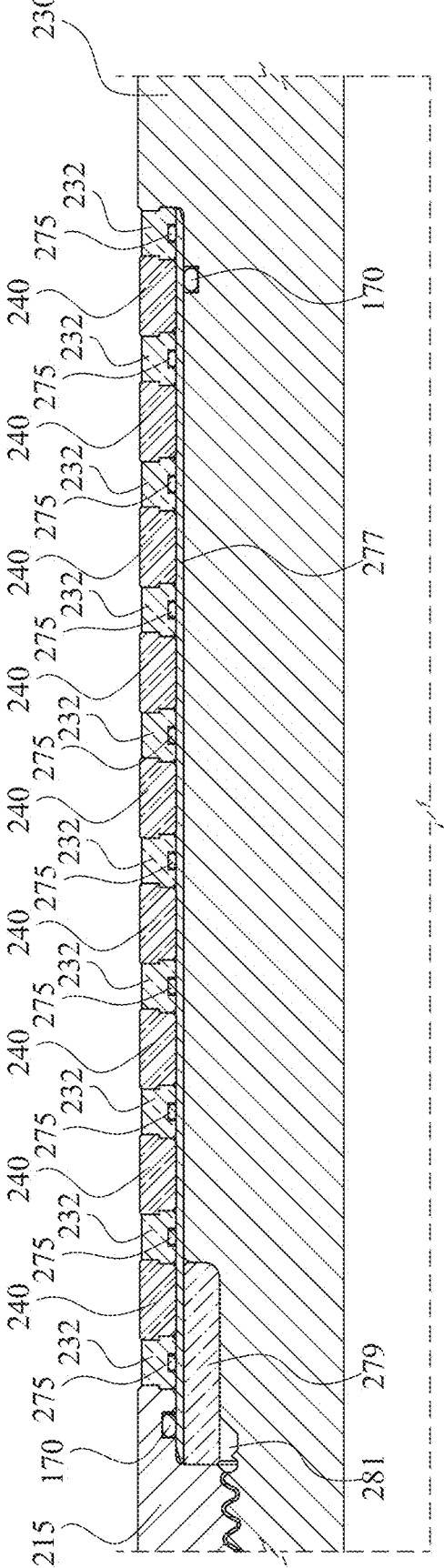

FIG. 5A shows a hybrid cross-sectional view of gap sub 200 with external gap assembly 220 in accordance with one or more embodiments of the present invention. Upper conductive portion 210 of gap sub 200 may include upper connection end 205, optional shoulder or profile area 245, optional shoulder or profile area 250, central lumen 255, and threaded 217 lower connection end 215. Similarly, lower conductive portion 230 of gab sub 200 may include threaded 227 upper connection end 225, central lumen 260, optional tapered profile 265, and lower connection end 235. Threaded 217 lower connection end 215 of upper conductive portion 210 removably engages threaded 227 upper connection end 225 of lower conductive portion 230. An electrical insulator (not independently illustrated) may be disposed between threaded 217 lower connection end 215 and threaded 227 upper connection end 225 to electrically insulate the engagement of threads 217, 227.

Continuing, FIG. 5B shows a detailed cross-sectional view of external gap assembly 220 in accordance with one or more embodiments of the present invention. As previously discussed, external gap assembly 220 may include a plurality of non-conductive spacer rings 232 and a plurality of high-strength conductive spacer rings 240 arranged in an alternating pattern about an exterior of gap sub 200. Gap sub 200 may include torque shoulder 279 that allows the plurality of non-conductive spacer rings 232 and the plurality of high-strength conductive spacer rings 240 to be compressed to a desired amount as well as provide desired torque when upper conductive portion 210 and lower conductive portion 230 are removably attached to one another during makeup. This allows for positive control of the stack in a manner that permits optimal sealing at the sides of the insulators. In addition, an electrical insulator (not independently illustrated) may be disposed between threads 217, 227 to electrically insulate their connection. As shown, the plurality of non-conductive spacer rings 232 and the plurality of high-strength conductive spacer rings 240 may have shapes that interlock such that the non-conductive spacer rings 232 cannot deform radially outward during typical operations downhole. A non-conductive external gap seal sleeve 277 may be disposed beneath spacer rings 232, 240 to electrically insulate conductive spacer rings 240 from upper conductive portion 210 and lower conductive portion 230 of gap sub 200. While the embodiment depicted shows ten (10) non-conductive spacer rings 232 and nine (9) high-strength conductive spacer rings 240 arranged in the alternating pattern, one of ordinary skill in the art will recognize that the external gap length may be modified by adding or removing spacer rings 232, 240 to achieve a desired gap length or target impedance in accordance with one or more embodiments of the present invention.

Figure 5C:
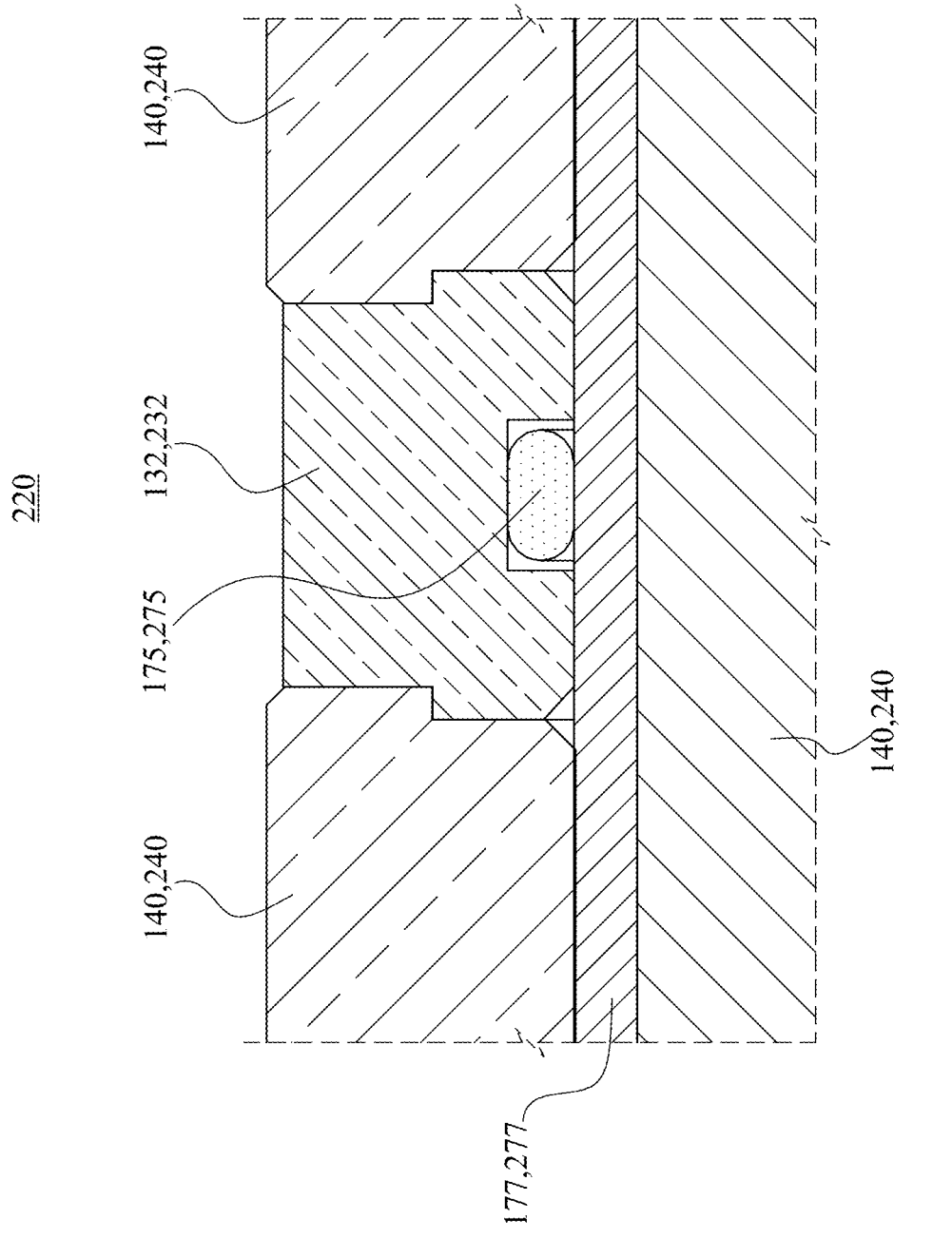
FIG. 5C shows a detailed cross-sectional view of a non-conductive spacer ring, an interior seal, and the non-conductive external gap seal sleeve in accordance with one or more embodiments of the present invention.

Continuing, FIG. 5C shows a detailed cross-sectional view of non-conductive spacer ring 132, 232, high-strength spacer ring 140, 240, interior seal 175, 275, and non-conductive external gap seal sleeve 177, 277 in accordance with one or more embodiments of the present invention. It is anticipated that the alternating pattern of non-conductive spacer rings 132, 232 and high-strength conductive spacer rings 140, 240 may, under certain situations, permit drilling fluids (not shown) to penetrate the interlocked area. While the non-conductive members ensure electrical isolation, potentially conductive drilling fluids (not shown) may short conductive members together. However, as shown in the figure, each non-conductive spacer ring 132, 232 includes an internal diameter where an interior seal, such as, for example, an O-ring, may be disposed. As such, each interior seal 175, 275 prevents the communication of drilling fluid from one side of a given non-conductive spacer ring 132, 232 to another, thereby ensuring, even when immersed in conductive drilling fluids (not shown), the upper conductive portion 110, 210 and the lower conductive portion 130, 230 remain electrically insulated from one another and enhancing the efficiency of EM transmission capabilities.

Figure 6:
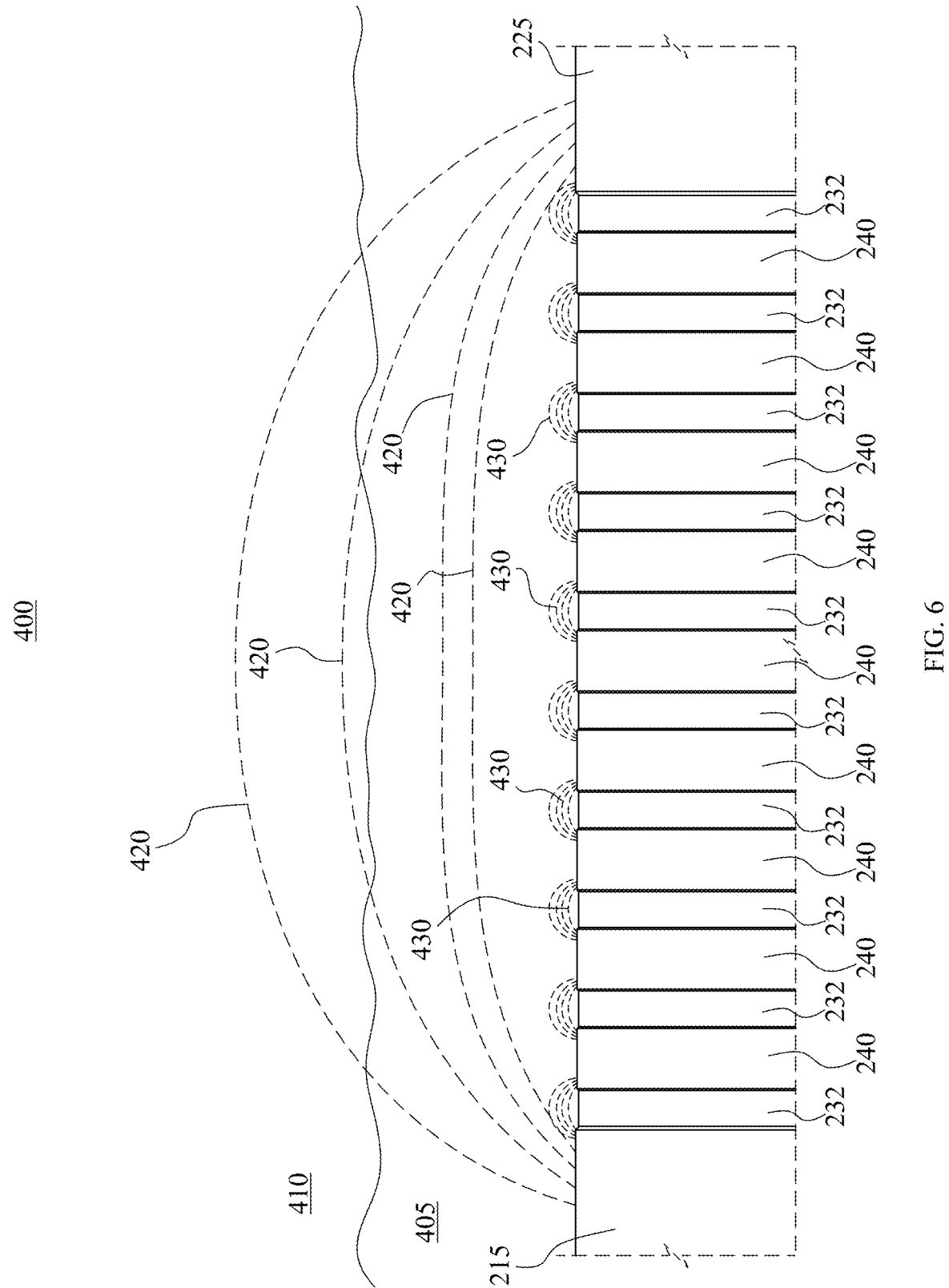
FIG. 6 shows a detailed elevation view of an external gap assembly showing electric field lines of electromagnetic signals being transmitted through earth in accordance with one or more embodiments of the present invention.

FIG. 6 shows a detailed elevation view of external gap assembly 220 showing electric fields of electromagnetic signals 420 being transmitted through earth 410 in accordance with one or more embodiments of the present invention. Gap sub 200 may be disposed downhole 405 and the operator may wish to use EM telemetry to transmit sensor data through the formation 410 to the surface (not shown). External gap assembly 220 may extend the effective gap length between upper conductive portion 210 and lower conductive portion 230. In addition, external gap assembly 220 increases the impedance of current paths through drilling fluids (not shown) and formation 410, preventing the possibility of shorts between any components of insulated conductive portions of gap sub 200. Advantageously, a long external gap improves electric field geometry. While short gaps allow field lines to close the loop close to gap sub 200, longer gaps push the field lines further out in a manner that minimizes unhelpful field density near gab sub 200 and increases field density away from gap sub 200, which contributes to measurable gradient at the surface. The length of external gap assembly 220 may be modified as needed to achieve a sufficiently high impedance of the leakage paths. As current will flow through the path of least resistance, external gap assembly 220 creates a highly resistive path that enhances EM signal transmission from gap sub 200 into formation 410.

In certain embodiments, non-conductive spacer rings 232 may be composed of PEEK. PEEK is commonly used for electrical insulation in downhole applications and offers a unique combination of mechanical properties including resistance to chemicals, wear, fatigue, and creep as well as exceptionally high temperature resistance up to 260° C. In other embodiments, non-conductive spacer rings 232 may be composed of non-conductive thermoplastic polymer. In still other embodiments, non-conductive spacer rings 232 may be composed of thermoset polymers. In still other embodiments, non-conductive spacer rings 232 may be composed of combinations thereof. One of ordinary skill in the art having the benefit of this disclosure will recognize that non-conductive spacer rings 232 may be composed of any material that is non-conductive and suitable for use in the downhole environment of a given application.

In certain embodiments, high-strength conductive spacer rings 240 may be composed of non-magnetic stainless steel. In other embodiments, high-strength conductive spacer rings 240 may be composed of non-magnetic metal alloys, ceramics, and non-stainless steel or alloys thereof. In still other embodiments, high-strength conductive spacer rings 240 may be composed of combinations thereof. One of ordinary skill in the art having the benefit of this disclosure will recognize that high-strength conductive spacer rings 240 may be composed of any material that is non-magnetic and provides sufficient strength for abrasion and forces encountered in the downhole environment.

In certain embodiments, non-conductive external gap seal sleeve 277 may be composed of PEEK. In other embodiments, non-conductive external gap seal sleeve 277 may be composed of thermoplastics, thermosets, or PPS. In still other embodiments, non-conductive external gap seal sleeve 277 may be composed of any combinations thereof. One of ordinary skill in the art having the benefit of this disclosure will recognize that non-conductive external gap seal sleeve 2177 may be composed of any material that is non-conductive and suitable for use in the downhole environment of a given application.

Advantageously, in one or more embodiments of the present invention, an external gap assembly allows for the controlled increase of resistance across a non-conductive gap of a gap sub that reduces leakage current and permits the generation of the strongest possible EM signal for transmission and reception. Further, in one or more embodiments of the present invention, an external gap assembly enhances EM field geometry. Small gaps permit field lines to close the loop very close to the gap sub. While a longer gap pushes field lines further out, this minimizes unhelpful field density near the gab sub and increases field density away from the gap, which contributes to measurable gradient at the surface.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

The invention claimed is:

1. An external gap assembly for a gap sub comprising:
a plurality of non-conductive spacer rings and a plurality of high-strength conductive spacer rings arranged in an alternating pattern about an exterior of the gap sub;

a non-conductive external gap seal sleeve disposed beneath the spacer rings that electrically insulates the conductive spacer rings from an upper conductive portion and a lower conductive portion of the gap sub;
a plurality of interior seals disposed on an internal diameter of the corresponding plurality of non-conductive spacer rings in between the non-conductive spacer rings and a first side of the non-conductive external gap seal sleeve;
a first seal disposed between an internal diameter of the upper conductive portion and the first side of the non-conductive external gap seal sleeve; and
a second seal disposed between an internal diameter of the lower conductive portion and a second side of the non-conductive external gap seal sleeve,
wherein the arrangement of the plurality of interior seals, the first seal, and the second seal prevent all internal fluid pathways between all high-strength conductive spacer rings and both the upper conductive portion and the lower conductive portion.

2. The external gap assembly of claim 1, further comprising an interior ceramic torque shoulder ring disposed on an interior between the upper and lower conductive portions of the gap sub.

3. The external gap assembly of claim 1, wherein the alternating pattern begins and ends with a non-conductive spacer ring.

4. The external gap assembly of claim 1, wherein the alternating pattern comprises 4 non-conductive spacer rings and 3 high-strength conductive spacer rings.

5. The external gap assembly of claim 1, wherein the alternating pattern comprises 10 non-conductive spacer rings and 9 high-strength conductive spacer rings.

6. The external gap assembly of claim 1, wherein an external gap length can be modified by adding or removing spacer rings to achieve a desired external gap length or target impedance.

7. The external gap assembly of claim 1, wherein each of the plurality of non-conductive spacer rings and the plurality of high-strength conductive spacer rings comprise interlocking shapes such that the non-conductive spacer rings cannot deform radially outward.

8. The external gap assembly of claim 1, wherein the plurality of non-conductive spacer rings and high-strength conductive spacer rings are put under compression when an upper conductive portion and a lower conductive portion of the gap sub are removably attached to one another that allows for positive control for a stack of the plurality of non-conductive spacer rings and the plurality of high-strength conductive spacer rings that permits optimal sealing at a plurality of sides of each of the plurality of non-conductive spacer rings.

9. The external gap assembly of claim 1, wherein the non-conductive spacer rings are composed of polyetheretherketone, non-conductive thermoplastic polymers, thermoset polymers, or combinations thereof.

10. The external gap assembly of claim 1, wherein the high-strength conductive spacer rings are composed of non-magnetic stainless steel, non-magnetic metal alloys, ceramics, non-stainless steel, or alloys or combinations thereof.

11. The external gap assembly of claim 1, wherein the non-conductive external gap seal sleeve is composed of polyetheretherketone, non-conductive thermoplastic polymers, thermoset polymers, or combinations thereof.

12. A gap sub comprising:

a tubular comprising an upper conductive portion and a lower conductive portion that are electrically insulated from one another;

an external gap assembly comprising a plurality of non-conductive spacer rings and a plurality of high-strength conductive spacer rings arranged in an alternating pattern about an exterior of the tubular; and a non-conductive external gap seal sleeve disposed beneath the spacer rings that electrically insulates the conductive spacer rings from the upper conductive portion and the lower conductive portion of the tubular;

a plurality of interior seals disposed on an internal diameter of the corresponding plurality of non-conductive spacer rings in between the non-conductive spacer rings and a first side of the non-conductive external gap seal sleeve;

a first seal disposed between an internal diameter of the upper conductive portion and the first side of the non-conductive external gap seal sleeve; and a second seal disposed between an internal diameter of the lower conductive portion and a second side of the non-conductive external gap seal sleeve, wherein the arrangement of the plurality of interior seals, the first seal, and the second seal prevent all internal fluid pathways between all high-strength conductive spacer rings and both the upper conductive portion and the lower conductive portion.

13. The gap sub of claim 12, further comprising an interior ceramic torque shoulder ring disposed on an interior between the upper and lower conductive portions of the gab sub.

14. The gap sub of claim 12, wherein the alternating pattern begins and ends with a non-conductive spacer ring.

15. The gap sub of claim 12, wherein the alternating pattern comprises 4 non-conductive spacer rings and 3 high-strength conductive spacer rings.

16. The gap sub of claim 12, wherein the alternating pattern comprises 10 non-conductive spacer rings and 9 high-strength conductive spacer rings.

17. The gap sub of claim 12, wherein an external gap length can be modified by adding or removing spacer rings to achieve a desired external gap length or target impedance.

18. The gap sub of claim 12, wherein the plurality of non-conductive spacer rings and the plurality of high-strength conductive spacer rings comprise interlocking shapes such that the non-conductive spacer rings cannot deform radially outward.

19. The gap sub of claim 12, wherein the plurality of non-conductive spacer rings and high-strength conductive spacer rings are put under compression when an upper conductive portion and a lower conductive portion of the gap sub are removably attached to one another that allows for positive control for a stack of the plurality of non-conductive spacer rings and the plurality of high-strength conductive spacer rings that permits optimal sealing at a plurality of sides of each of the plurality of non-conductive spacer rings.

20. The gap sub of claim 12, wherein the non-conductive spacer rings are composed of polyetheretherketone, non-conductive thermoplastic polymer, or combinations thereof.

21. The gap sub of claim 12, wherein the high-strength conductive spacer rings are composed of non-magnetic stainless steel, non-magnetic metal alloys, ceramics, non-stainless steel, or alloys, or combinations thereof.

22. The gap sub of claim 12, wherein the non-conductive external gap seal sleeve is composed of polyetheretherketone, non-conductive thermoplastic polymers, thermoset polymers, or combinations thereof.

\* \* \* \* \*